United States Patent

[11] 3,571,558

[72] Inventor John A. Hogan, Jr.
 Somerset, N.J.
[21] Appl. No. 747,354
[22] Filed July 24, 1968
[45] Patented Mar. 23, 1971
[73] Assignee Union Carbide Corporation

[54] APPARATUS FOR ARC STARTING
 6 Claims, 4 Drawing Figs.
[52] U.S. Cl. .................................................. 219/131,
 219/137
[51] Int. Cl. .................................................. B23k 9/10
[50] Field of Search............................................ 219/131,
 137

[56] References Cited
 UNITED STATES PATENTS
3,008,036 11/1961 Greene et al. .................. 219/131
3,154,721 10/1964 Sommeria ..................... 219/131X
3,260,890 7/1966 Normando et al. ............ 219/131X
3,335,317 8/1967 Sciaky .......................... 219/131X
3,356,928 12/1967 Parrish ......................... 219/131X Primary Examiner—A. Bartis
Assistant Examiner—George A. Montanye
Attorneys—Paul A. Rose, Thomas I. O'Brien, Dominic J. Terminello and Eugene Lieberstein ABSTRACT: Apparatus for starting an arc between an electrode and a workpiece comprising means for impressing a high DC voltage across the gap formed between the electrode and the work, the voltage having a sufficient magnitude to establish a spark in the form of a very low current streamer and means including energy storage means for discharging a predetermined amount of electrical energy into the spark to initiate thermionic emission wherein such energy storage means is connected in such manner as to be charged by the welding power supply.

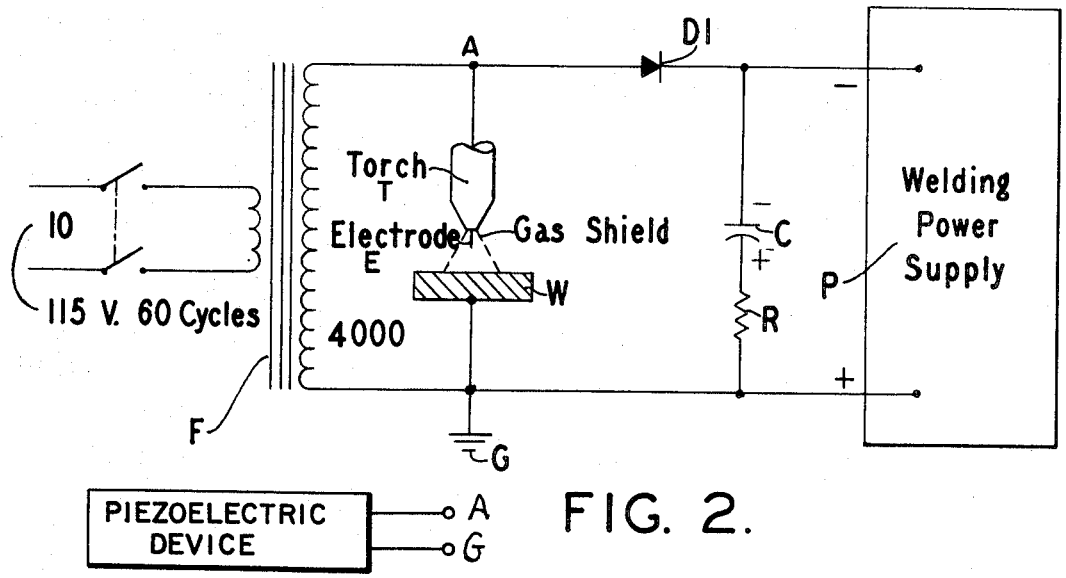
FIG. 2.
FIG. 4
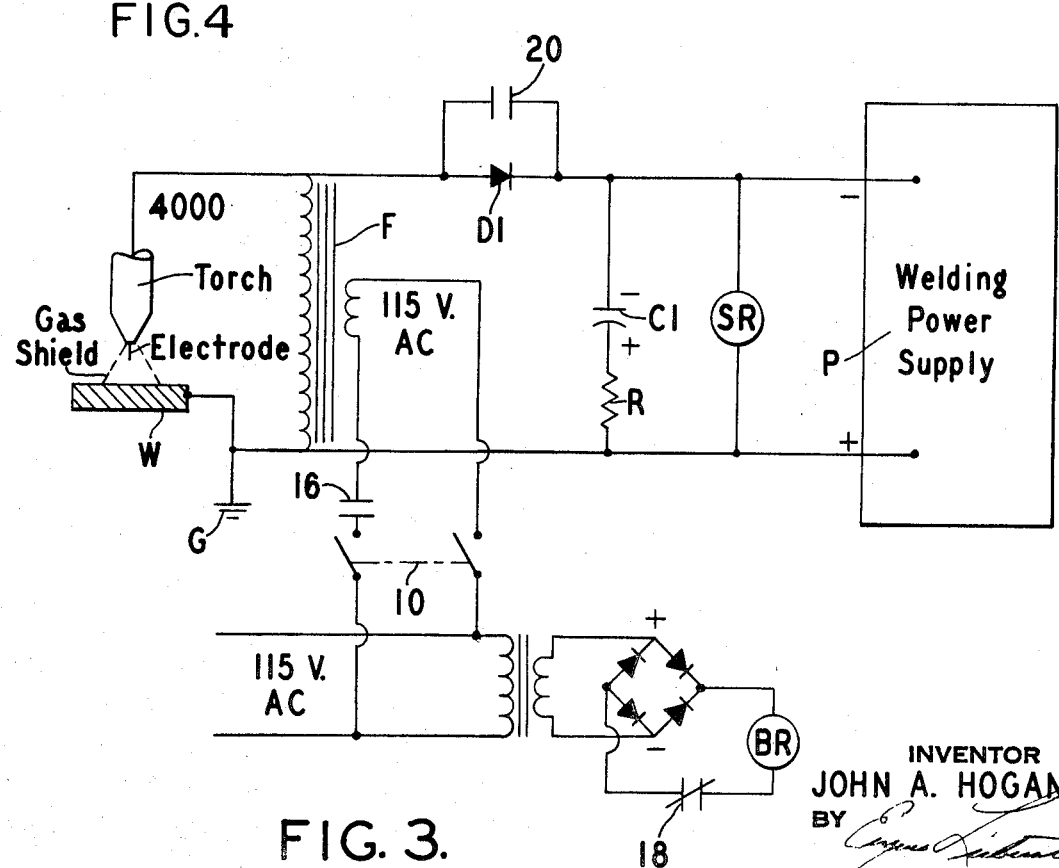
FIG. 3.
INVENTOR
JOHN A. HOGAN, JR.
BY
ATTORNEY

APPARATUS FOR ARC STARTING

This invention relates to arc starting and more particularly to a method and apparatus for establishing a direct current arc discharge.

Historically the first welding arcs were initiated by touching the electrode to the work. This simple procedure, although effective, has many serious drawbacks, e.g. weld contamination, directional arc instability, possibility of burn-through where light gauge work is involved, etc. As the welding industry advanced technically alternative techniques for starting an arc were sought. One solution, now in conventional use, involves the application of high frequency voltage. High frequency voltage breaks down the gaseous atmosphere between the electrode and work creating a path for welding power supply current. Although effective for establishing an arc, high frequency current radiates energy within a fairly wide frequency band causing local interference with radio communications. As such, special precautions must be taken to minimize radiation. Interference with local communications cannot, however, be entirely eliminated. Furthermore, high frequency current tends to leak through and break down the torch insulation causing in some cases torch malfunction. The welding operator is also susceptible to high frequency burns. Additionally, it is difficult with high frequency starting to ignite the arc at a predetermined point on the workpiece at normal standoff.

It has been discovered that a DC arc discharge may be established between the electrode and work without the necessity for making physical contact therebetween by impressing at least one pulse of high voltage across the gap formed between the electrode and work, said pulse being of sufficient magnitude to establish a spark across said gap, and discharging a predetermined amount of electrical energy into said gap to initiate electrode thermionic emission thereby forming the arc.

Among the advantages to be derived from the above are:
1. positive arc ignition without electrode to work contact;
2. minimal possibility of torch breakdown or damage;
3. the arc can be easily and accurately ignited at a given point on the workpiece;
4. little danger of shock or burn;
5. lends itself easily to mechanized welding setups;
6. there is no danger of losing energy due to inductive coupling with external agents.

It is accordingly the principle object of the present invention to provide apparatus for initiating an arc between an electrode and workpiece, maintained a predetermined distance apart, by means of direct current discharge.

Other objects and advantages of the present invention will become apparent from a reading of the specification and from the accompanying drawings wherein:

FIG. 2 is a schematic circuit diagram of the preferred embodiment for carrying out the present invention.

FIG. 3 is a modified schematic circuit diagram of FIG. 2.

FIG. 4 is a block representation of a piezoelectric device with output terminals.

Figure 1:
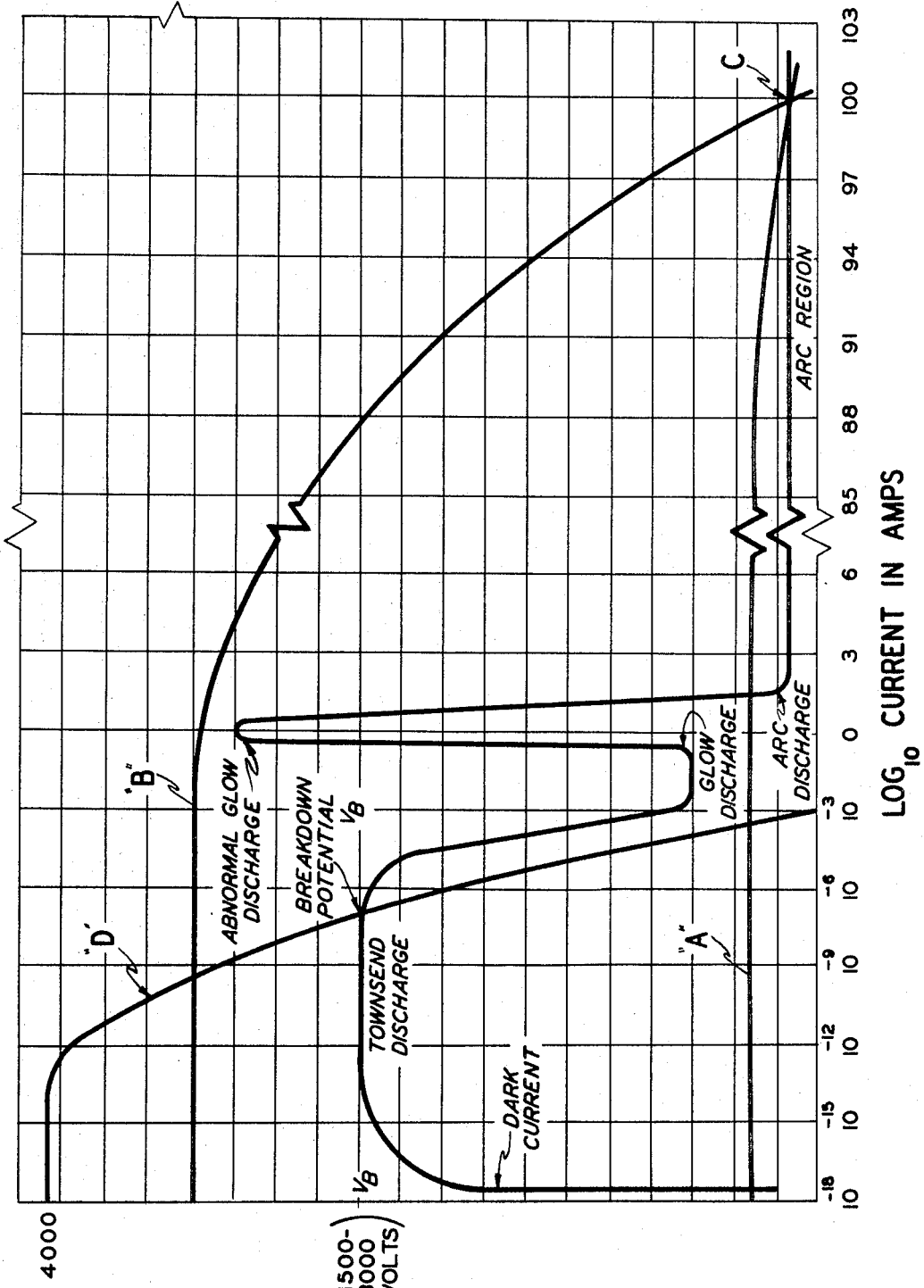
FIG. 1 is a graph of a typical volt-ampere characteristic of a gaseous discharge.

FIG. 1 is a typical volt-ampere characteristic curve of a gaseous discharge occurring between two parallel electrodes at a given electrode separation and pressure. A welding electrode is the equivalent of a cathode while the workpiece is representative of an anode. An adjustable source of potential in series with a resistor is connected across the electrode to work gap. The current through the resistor is observed as a function of the voltage across the gap. As the gap voltage is increased a miniscule current known as "dark current" begins to flow which remains relatively constant until the breakdown or sparking potential $V_B$ is reached. This dark current is dependent upon a source of primary electrons and ions that are created from external sources such as radiation and/or thermal agitation. Upon reaching the breakdown potential secondary emission and electron multiplication occurs creating a source of electrons independent of the primary source. The voltage at breakdown remains substantially constant for a relatively wide range of current. A discharge marked by this high voltage plateau is known as a Townsend Discharge. Upon increasing the current beyond the region classified as Discharge. Discharge a glow appears characterized by brightly colored luminous regions. This type of discharge, conventionally classified as a glow discharge, is evidenced by a sharp decrease in voltage. A further increase in current results in a corresponding increase in voltage causing an abnormal glow discharge. The abnormal glow region is extremely unstable and will unpredictably go into an arc when thermionic emission becomes the dominant factor. Welding arcs are associated with the flow of large currents. A more detailed discussion of the phenomena characterizing a gaseous discharge can be found in a text entitled "Basic Data of Plasma Physics" by Sanborn C. Brown.

A welding power supply is designed to have a general volt-ampere characteristic as denoted by the letter A on FIG. 1. Once an arc is established the welding power supply, having a characteristically low open circuit voltage and high current capacity, is in a position to maintain the arc for the duration of the welding operation. If a welding power supply were designed with an open circuit voltage of high enough magnitude such that it possessed a volt-ampere characteristic as denoted by the letter B on FIG. 1, arc starting would not be a problem. Upon turning on the power supply, breakdown would instantly occur resulting almost immediately in an arc discharge. A point of stability would be reached at c in the arc region where the two curves intersect. Although this appears to be a simple solution it is impractical and undesirable because of the danger involved to the welding operator. It is for this reason among others that welding power supplies are designed for low open circuit voltage.

It has been discovered in accordance with the present invention that one may advance from a low current breakdown in the Townsend or glow region to an arc discharge by adding a predetermined amount of electrical energy at a voltage much lower than implied from the discharge characteristic. The required magnitude of electrical energy is dependent upon shielding gas, arc length, gas pressure, electrode material and electrode geometry. ONce the arc is established it may be maintained by the welding power supply.

Referring now to FIG. 2, representing the preferred circuit arrangement for initiating and maintaining an arc; a nonconsumable tungsten electrode E is firmly held within torch T at a predetermined height above workpiece W. Shielding gas is passed down through torch T by means not shown for protecting the arc after ignition from atmospheric contamination.

A step-up transformer F is connected on the primary side through switch 10 to a conventional 115 volt 60 cycle main power source and is connected on the secondary side across the electrode E and work W. The work w is grounded at point G. Welding power supply P in series with diode D1 is connected in parallel with the electrode and work. Capacitor C, preferably a polarized capacitor, is connected in series with resistor R, the series combination being connected in parallel with welding power supply P. For straight polarity operation capacitor C is connected as shown in FIG. 2. For reverse polarity operation, the terminals of capacitor C, if a polarized capacitor is used, and diode $D_1$ are reversed.

The circuit of FIG. 2 operates in a manner to be now described. Welding power supply P is a conventional voltage or current controlled power supply. The output impedance i.e. the impedance looking into the power supply is quite low having a magnitude of only several ohms. The open circuit output voltage of the power supply is in the general range of between 40 and 150 volts depending on the welding operation to be performed. For purposes of this invention the magnitude of the open circuit voltage is not critical. Once power supply P is turned on, capacitor C charges to the welding power supply open circuit voltage. The magnitude of capacitor C depends upon the amount of energy required to initiate thermionic emission. Upon depressing switch 10 a high voltage is impressed across the secondary of transformer F sufficient to cause a discharge between the electrode E and work W. Transformer F if a high voltage low power transformer specifically selected to have a very low short circuit current characteristic. It is desirable that the short circuit current capacity of transformer F be no higher than 10 ma. At such a low current level there is no chance of injuring the welding operator even if he were to accidentally ground himself across the high voltage secondary side of the transformer. The voltage across the secondary need only be high enough to cause a low current Townsend Discharge. A typical volt-ampere characteristic for transformer F is shown at D in FIG. 1 having an open circuit voltage of 4,000 volts and a short circuit current of 1 ma. An open circuit voltage of 4,000 volts has been selected for illustrative purposes since such a voltage is high enough to break down the gaseous atmosphere between the electrode and work for most commonly used inert shielding gases. This of course assumes a predetermined distance between the electrode and work. As the distance is increased, more voltage is required and vice versa. In one example, using an argon shielded atmosphere, an open circuit voltage of 4,000 volts was found satisfactory for an electrode to work spacing of between one-fourth and three-fourths inches.

The voltage built up across the secondary of transformer F is half-wave rectified by diode D1. Hence, torch T sees only a rectified AC voltage. Resistor R acts as a current limiting resistor and is preferably of low ohmic value. As soon as the magnitude of the voltage is equal to the breakdown potential across the gap, a spark occurs in the form of a thin low current streamer providing an immediate path for capacitor C to release its energy. The current density of the spark determines the necessary capacitor voltage to initiate a transition from the low current breakdown to an arc. The amount of energy stored in the capacitor depends upon the capacitor voltage and the magnitude of the capacitor. The capacitor must be capable of releasing sufficient energy to cause thermionic emission. The amount of energy required depends in turn upon the arc length, the size and type of electrode, the shielding gas employed and other variables such as the type of welding power supply used. Therefore, the magnitude of the capacitor will vary over a rather wide range. However, a capacitor in the area of 4,000 $\mu f$. was found to be quite adequate for argon shielding gas with an arc length of up to 1 inch where a single-phase power supply was used. Moreover, where argon is employed the capacitor need only be charged to 40 volts for practical arc lengths of less than one-fourth inch. Capacitor C is charged as hereinbefore mentioned by the open circuit voltage of welding power supply P. Once ONce thermionic emission is started the current will increase until a stable arc is formed. As soon as the arc is established, the welding power supply will in the conventional manner maintain the arc until it is extinguished. It is to be noted that capacitor C functions as a filter for welding power supply P after the arc is established and has only minimal effect on the welding operation since its effective impedance is much greater than that offered by the arc path. The latter is also true of the high voltage input transformer F which may be left in circuit or removed by opening switch 10.

Although the circuit arrangement shown in FIG. 2 is preferred, the invention is not to be construed as limited thereto. The high voltage necessary to establish a discharge between the electrode and work may be formed by any high voltage low current source or device. A piezoelectric device, commercially available as a "spark pump" and symbolically represented in FIG. 4, may be used in place of transformer F by connecting the output terminals of the device at points A and G as shown in FIG. 2. An electronic high voltage pulse generator may also be used. Furthermore, it is within the scope of the invention to use a series circuit arrangement to discharge the energy stored in capacitor C.

Diode D1 in FIG. 2 must be capable of withstanding the high voltage initially impressed across the torch as well as the large welding current supplied from the welding power supply P after arc ignition. To meet these stringent requirements a rather expensive diode must be used. To avoid the need for such an expensive diode the circuitry of FIG. 2 has been modified as shown in FIG. 3. A sensing relay SR is located in parallel with the welding power supply P. The sensing relay SR has a normally open contact 16 in series with switch 10 and the main 115 AC power source, and a normally closed contact 18 in series with a bypass relay BR. Bypass relay BR has a normally open contact 20 in parallel with diode D1. The open circuit voltage across the welding power supply P activates sensing relay SR closing normally open contact 16 and opening normally closed contact 18. By depressing switch 10, an arc is formed between the electrode E and work W in the manner described and illustrated with reference to FIGS. 1 and 2. As soon as the arc is established the sensing relay SR deenergizes in response to the drop in power supply voltage returning contacts 16 and 18 to their normal positions. With contact 18 in its closed position, bypass relay BR energizes closing normally open contact 20 which in turn provides a shorted path around diode D1 for the remainder of the welding operation. In addition, the high voltage transformer F is automatically disconnected from the main power line when sensing relay SR is deenergized.

While the invention has been described in terms of starting a main welding arc, it is obvious that the invention is applicable in general to any operation requiring an arc.

I claim:

1. Arc working apparatus comprising: a power supply having a relatively low open circuit voltage connected in series circuit relationship between a nonconsumable electrode and workpiece, the tip of said electrode being located a predetermined distance from said workpiece to form a gap therebetween; high voltage energization means electrically connected to said electrode and said workpiece for initiating a nonlethal Townsend discharge, with a current having a magnitude of no greater than about 10 ma., between the tip of said electrode and said workpiece energy storage means being connected in such manner as to be charged by said power supply and being electrically connected across the gap for discharging stored energy into said gap for establishing an arc; and unidirectional current means connected in series between said power supply and said high voltage energization means for isolating in part said high voltage energization means from said power supply during the starting interval.

2. Arc working apparatus as defined in claim 1 wherein said high voltage energization means is a high voltage low current transformer having a primary and secondary winding, said secondary winding being connected across the electrode and workpiece and said primary winding being connected directly to an AC source of power.

3. Arc working apparatus as defined in claim 1 wherein said high voltage energization means is a piezoelectric device.

4. Arc working apparatus as defined in claim 1 wherein said energy storage means comprises a capacitor.

5. Arc working apparatus as defined in claim 4 wherein said capacitor is connected in series with a resistor the combination being connected in parallel across said welding power supply and wherein said unidirectional current means is connected in series between said parallel combination and said electrode and work.

6. Arc working apparatus as defined in claim 5 wherein said unidirectional current means is a diode and further comprising means for shorting said diode in response to a predetermined decrease in potential across said power supply.